United States Patent [19]

Tsuda et al.

[11] 4,387,986

[45] Jun. 14, 1983

[54] MANUSCRIPT FEED DEVICE FOR AN ELECTROPHOTOGRAPHIC APPARATUS

[75] Inventors: Hiroshi Tsuda, Mitaka; Kiyoshi Miyashita; Masaji Nishikawa, both of Hachioji; Akira Shimizu, Fuchu; Muneo Kasuga, Hachioji, all of Japan

[73] Assignee: Olympus Optical Company Limited, Tokyo, Japan

[21] Appl. No.: 192,925

[22] Filed: Oct. 1, 1980

Related U.S. Application Data

[63] Continuation of Ser. No. 29,461, Apr. 12, 1979, abandoned.

[30] Foreign Application Priority Data

Apr. 18, 1978 [JP] Japan ................................. 53-46184

[51] Int. Cl.$^3$ ............................................. G03B 27/62

[52] U.S. Cl. ......................................... 355/75; 355/25

[58] Field of Search ..................... 355/35 H, 8, 11, 25, 355/50, 51, 75, 76

[56] References Cited

U.S. PATENT DOCUMENTS

| | | | |
|---|---|---|---|
| 3,510,218 | 5/1970 | Limberger et al. | 355/51 |
| 3,597,074 | 8/1971 | Murgas et al. | 355/75 X |
| 3,659,937 | 5/1972 | Yamanoi | 355/75 X |
| 3,677,635 | 7/1972 | Van Auken et al. | 355/11 |
| 3,695,754 | 10/1972 | Washio et al. | 355/75 X |
| 4,009,955 | 3/1977 | Komori et al. | 355/51 X |
| 4,108,544 | 8/1978 | Mitsuyama et al. | 355/50 X |

FOREIGN PATENT DOCUMENTS 2756761 6/1978 Fed. Rep. of Germany ........ 355/75

*Primary Examiner*—G. Z. Rubinson

*Assistant Examiner*—W. J. Brady

*Attorney, Agent, or Firm*—Fleit, Jacobson & Cohn

[57] ABSTRACT

An electrophotographic apparatus for printing or forming at least one copy of a manuscript comprising a manuscript feed mechanism including upper and lower side feed mechanisms arranged above and below a rectilinear manuscript feed path including a slit light exposure portion at which a manuscript image is projected onto a photosensitive drum, said upper side feed mechanism being movable with respect to said slit light exposure portion to define thin and thick manuscript feed paths, respectively. A thick manuscript feed mechanism is provided in the lower side feed mechanism for feeding a thick manuscript carriage made of transparent plate. The apparatus further comprises a first movable edge guide for positioning an edge of a sheet manuscript and a second fixedly arranged guide for positioning the edge of the thick manuscript carriage. The first guide is preferably positioned inwardly with respect to the second guide viewed in a widthwise direction of the manuscript.

3 Claims, 15 Drawing Figures

MANUSCRIPT FEED DEVICE FOR AN ELECTROPHOTOGRAPHIC APPARATUS

This is a continuation, of application Ser. No. 29,461 filed Apr. 12, 1979, abandoned.

BACKGROUND OF THE INVENTION

The present invention relates generally to an electrophotography, and more particularly to an electrophotographic apparatus which comprises a document feed mechanism for advancing a sheet like document and a thick document such as a book placed on a thick document carriage through a light exposing portion.

Various kinds of electrophotographic apparatuses have heretofore been proposed and used in practice. One of these conventional electrophotographic apparatuses is mainly used for obtaining copies of a thick manuscript or document such as books or the like, while the other electrophotographic apparatus is mainly used for obtaining copies of a sheet manuscript.

In the electrophotographic apparatus mainly used for obtaining copies of the thick manuscript, in the case of obtaining copies of the sheet manuscript, the sheet manuscript is disposed on a manuscript carriage and urged against it by a manuscript holding cover. The manuscript carriage or a projection optical system is reciprocated for number of times corresponding to the number of sheets to be copied, thereby obtaining copies. In this case, the operation of opening and closing the manuscript holding cover in order to set the sheet manuscript on the manuscript carriage is troublesome in operation. In addition, wind pressure produced when the manuscript holding cover is opened and closed tends to displace or blow off the sheet manuscript set beforehand, thereby rendering the operation very inconvenient and bad in efficiency. In general, the kind of the manuscript to be copied belonging to the sheet manuscript is far larger than that belonging to the thick manuscript. As a result, the above is the important drawback inherent to the electrophotographic apparatus mainly obtaining copies of the thick manuscript.

On the other hand, the electrophotographic apparatus mainly used for obtaining copies of the sheet manuscript is classified into one type in which the sheet manuscript is directly inserted into and passes through a light exposure portion so as to be scanned by exposed light and into another type in which if the sheet manuscript is introduced into the apparatus it is automatically set to a given position where it is repeatedly scanned by the exposed light for the number of times corresponding to the number of the copies to be obtained and then is automatically discharged from the apparatus.

The former type electrophotographic apparatus can insert the sheet manuscripts in succession into the light exposure portion and hence is very rapid in operation if compared with the above mentioned electrophotographic apparatus mainly used for obtaining copies of the thick manuscript and adapted to change a previous manuscript to the next manuscript after the previous manuscript has been scanned by the exposed light.

In addition, the former type electrophotographic apparatus is not required to use a reciprocating mechanism for the manuscript carriage or projection optical system, so that the apparatus as a whole is simple in construction and can be manufactured in a less expensive manner. But, in the case of obtaining a plurality of copies from the same manuscript, the manuscript must repeatedly be inserted into the light exposure portion for number of times corresponding to the number of copies to be obtained, and as a result, the apparatus becomes very troublesome in operation and bad in efficiency.

The latter type electrophotographic apparatus has the advantage that a desired number of copies can be obtained by inserting the sheet manuscript only one time into the apparatus. But, this apparatus has the drawback that the apparatus as a whole is complex in construction, that a manuscript feed path in complex in construction and hence is troublesome in feed operation and that the manuscript tends to be easily broken.

The former type electrophotographic apparatus can obtain copies of the thick manuscript with the aid of a suitable auxiliary means. On the contrary, it is almost impossible to obtain copies of the thick manuscript by the latter type electrophotographic apparatus. To the electrophotographic apparatus mainly used for obtaining copies of the thick manuscript has been added a sheet manuscript feed mechanism which can automatically feed a sheet manuscript disposed on a manuscript carriage and automatically discharge it after a required number of sheets have been repeatedly scanned by the exposed light. But such kind of sheet manuscript feed mechanism is complex in construction and large in size and hence is generally used for an expensive high speed copying machine.

The auxiliary means added to the former type electrophotographic apparatus mainly used for obtaining the sheet manuscript and operative to obtain copies of the thick manuscript comprises a sheet manuscript driving roller, its corresponding driven roller and an end driven roller independent of the driven roller and arranged at the outside of the driven roller, the end driven roller being co-operative with the driving roller so as to feed a light transmission thin plate for the thick manuscript and constructed such that in the case of obtaining copies of the thick manuscript the sheet manuscript feed driven roller is pushed aside or removed and the light transmission thin plate with the thick manuscript disposed thereon is held between the driving roller and the end driven roller so as to be fed and scanned by the exposed light. That is, the light transmission thin plate formed such auxiliary means is fed at a given feed speed by means of a fractional force produced between the plate and the driving and end driven rollers. But, in the case of obtaining copies of the thick manuscript by means of such auxiliary means, an operator is always required to hold down the thick manuscript by a pressure which is sufficient to prevent the thick manuscript from displacing or from rising during feed of the transparent thin plate. As a result, unreasonable force is subjected to the thin plate while it is fed. The frictional force produced between the driving roller and the end driven roller for feeding the light transmission thin plate sandwiched therebetween becomes changed. As a result, it is impossible to maintain the given feed speed, thereby inducing a blur in copy or an inclined displacement of the transparent thin plate. Further, it is necessary to feed the thick manuscript carriage in such a manner that the transparent thin plate can be correctly positioned between the rollers. As a result, in the case of using such auxiliary means, the operator is required to have a certain order of skill and operate with the greatest possible care. In addition, the end driven roller is projected from the surface along which the thin plate passes, so that the operator is also required to pay attention not to damage his finger or the manuscript got caught in the projected end driven roller.

In the case of obtaining a plurality of copies from the same manuscript, the above mentioned operation must be repeated, so that the operation becomes more complex and the rate of damaging the precious manuscript becomes high. In addition, the separate need of the driven roller exclusively used for feeding the thick manuscript makes the apparatus complex in construction.

SUMMARY OF THE INVENTION

An object of the invention, therefore, is to provide an electrophotographic apparatus which can eliminate the above mentioned drawbacks, that is, which can obtain a copy of a sheet manuscript and thick manuscript without damaging the manuscript in a simple manner. It is another object of the invention to provide an electrophotographic apparatus which can guide an edge of a sheet like document and an edge of a thick document carriage by means of a simple operation.

A feature of the invention is the provision of an electrophotographic apparatus comprising a substantially rectilinear manuscript feed path including a slit light exposure portion through which is projected a manuscript image; a sheet manuscript feed mechanism including upper and lower side feed mechanisms arranged above and below said manuscript feed path at said slit light exposure portion with said manuscript feed path interposed therebetween, said upper side feed mechanism being mounted movably with respect to said slit light exposure portion; a thick manuscript feed mechanism provided at least in said lower side sheet manuscript feed mechanism for feeding a thick manuscript carriage under a condition that said upper side feed mechanism is removed from said lower side feed mechanism; and edge guide means provided in parallel with said manuscript feed path for positioning an edge of the sheet manuscript which is fed between the upper and lower side feed mechanism and an edge of the thick manuscript carriage on which a thick manuscript is disposed.

In an embodiment of the thick manuscript carriage for use in the electrophotographic apparatus according to the invention the carriage comprises a flat and transparent plate member on which a thick manuscript is to be disposed, a driven member provided integrally with the plate along at least one edge thereof in the direction parallel to the advancing direction, said driven member can engage with the thick manuscript feed mechanism without slip, and a positioning member provided integrally with the plate for positioning the thick manuscript placed on the plate. During the duplication the thick manuscript carriage is advanced with its side edge being in contact with the guide means provided in the apparatus.

According to a preferred embodiment of the electrophotographic apparatus according to the invention said edge guide means comprise a first movable guide for positioning the edge of the sheet manuscript and a second guide for positioning the edge of the thick manuscript carriage and the second guide is provided externally beyond the first guide viewed in a direction perpendicular to the direction of the manuscript feed path so that the edges of the sheet and thick manuscripts travel along the same locus.

DETAILED DESCRIPTION OF THE PREFERRED EMBODIMENTS

Figure 1:
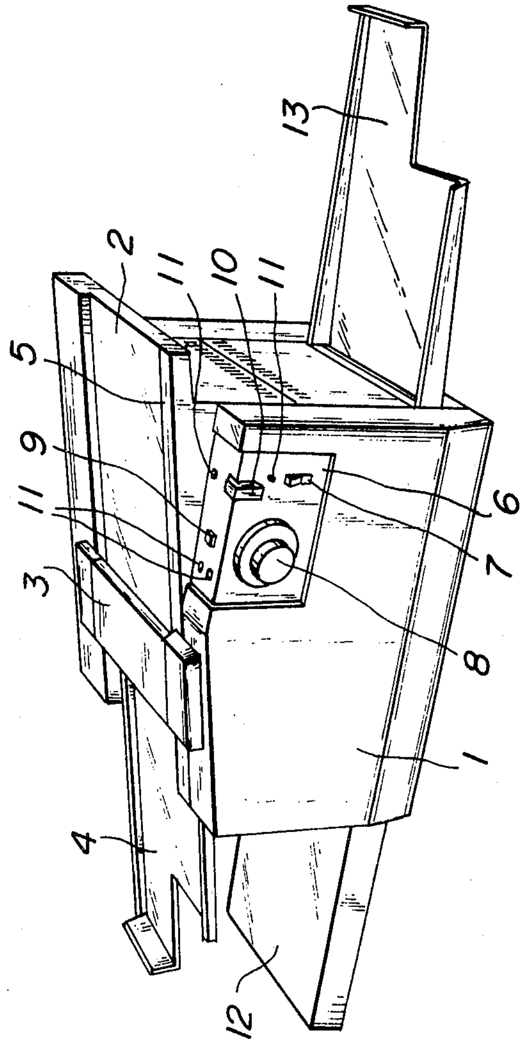
FIG. 1 is a perspective view of one embodiment of an electrophotographic apparatus according to the invention.

FIG. 1 shows one embodiment of an electrophotographic apparatus according to the invention. In the present embodiment the electrophotographic apparatus can form a plurality of duplicated copies from the same and single electrostatic charge latent image once formed on a photosensitive drum. It should be noted that the present invention is not limited only to such an apparatus, but may be applied to any other type of electrophotographic apparatus in which each copy is formed by respective exposure-scanning. Referring to FIG. 1, reference numeral 1 designates a main body or outer casing which is provided along its upper surface with a manuscript feed path composed of a manuscript carriage 2, light exposure portion 3 and detachable manuscript discharge tray 4 rectilinearly arranged in the order as mentioned above. A sheet manuscript (not shown) is disposed on the manuscript carriage 2 and slidably moved toward the left as viewed in FIG. 1. The sheet manuscript is held between manuscript feed rollers in the light exposure portion 3. The feed rollers cause the sheet manuscript to pass through the light exposure portion 3 at a given speed and discharge it onto the manuscript discharge tray 4. This sheet manuscript feed path is rectilinearly constructed as described above for the purpose of feeding the sheet manuscript without any trouble. In addition, in the present embodiment, the front end of the sheet manuscript feed path viewed in the advancing direction of the sheet manuscript is inclined downwardly for the purpose of effecting insertion and feed of the sheet manuscript in an extremely natural manner. The manuscript carriage 2 is provided at its one side with an edge guide 5 extending along the advancing direction of the manuscript and determining not only the position of the sheet manuscript to be inserted but also the position of a thick manuscript carriage to be described later.

The main body 1 is provided at its one side with an operation board 6 including an electric source switch 7, dial 8 for determining the number of copies to be obtained, stop button 9, light adjusting knob 10 and various kinds of display lamps 11. The dial 8 for determining the number of copies to be obtained is rotated so as to set a desired number of copies (1 to 20 in the present embodiment) to be obtained when the manuscript is scanned one time by exposed light. The stop button 9 is pushed to stop the copying operation when it is started when the dial 8 is set to any erroneous number of copies. The light adjusting knob 10 is moved forwardly or backwardly so as to change the brightness of a fluorescent lamp (not shown) incorporated into the light exposure portion 3 and give a correct exposed light corresponding to the density of the manuscript. The display lamps 11 function to display the ON state of the electric source switch 7, start and end of the copying operation, presence and absence of a record sheet or paper in a cassette to be described later, occurrence of paper jam or the like. A record sheet supply cassette 12 encloses therein record sheets each having a given size and superimposed one upon the other. The cassette 12 is detachably mounted on one end surface of the main body 1. If it is desired to change the size of the record sheet, another cassette enclosing record sheets having a desired size is selectively mounted on the main body 1. The main body 1 is provided at that end surface which is opposed to the end surface on which is mounted the cassette 12 with a discharge tray 13 for receiving a copy. One end of the discharge tray 13 is rotatably supported by the opposed side surfaces of the main body 1 and the free end of the discharge tray 13 is rotated upwardly about its supporting shaft and releasably locked to the main body 1.

In the embodiment shown in FIG. 1, the manuscript feed path may be made horizontal and the edge guide 5 may be provided on the manuscript carriage 2 at that side edge which is opposed to the edge guide 5 shown in FIG. 1.

Figure 2:
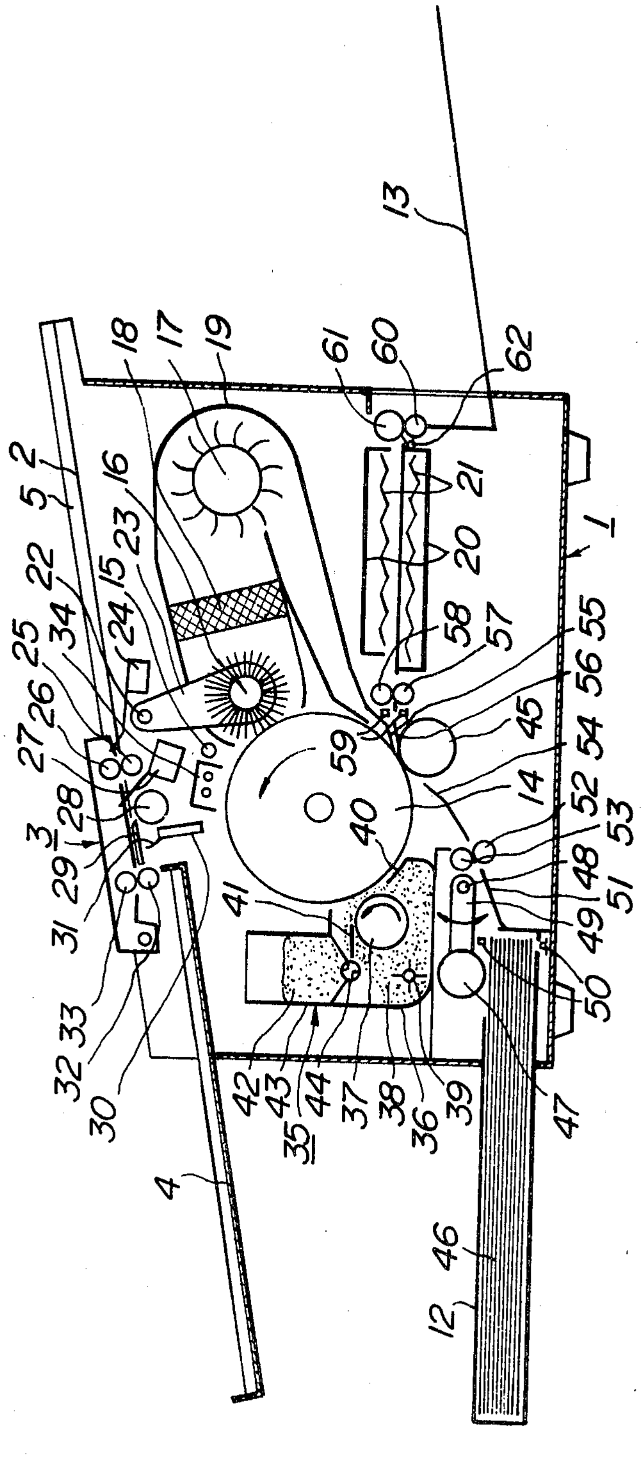
FIG. 2 is a diagrammatic cross-sectional view showing the interior construction of the electrophotographic apparatus shown in FIG. 1.

FIG. 2 shows one embodiment of an interior construction of the electrophotographic apparatus shown in FIG. 1 in section. A seamless photosensitive drum 14 is rotatably journaled in the main body 1 and is rotated in a direction shown by an arrow when the electric source switch 7 shown in FIG. 1 is made ON. In the present embodiment, the rotation of the photosensitive drum 14 causes a timing pulse to occur which controls various copying steps. At the same time, an erasion lamp 15 provided near the periphery of the photosensitive drum 14 is made ON to erase the electrostatic latent image remained on the photosensitive drum 14 at the previous copying step and a cleaning brush 16 is rotated to remove residual toners on the drum. The toners removed by the cleaning brush 16 are attracted toward a fan 17 and seized by a filter 18, the fan 17 being rotated by other driving source than that for rotating the cleaning brush 16. The cleaning brush 16, filter 18 and fan 17 are arranged in a duct 19.

In the present embodiment, the duct 19 is extended up to a transfer portion to be described later and a flow of air produced by the rotation of the fan 17 is used for the purpose of tearing off the record sheet closely adhered to the photosensitive drum 14 immediately after the transfer portion. As soon as the electric source switch 7 is made ON, an oven type heater 21 enclosed in a fixing device 20 is energized to raise its temperature.

The cleaning brush 16 is rotatably mounted on an arm 23 which is rotated about a supporting shaft 22 by means of an operating mechanism (not shown) to cause the cleaning brush 16 to bring into contact with and separate from the photosensitive drum 14.

If the photosensitive drum 14 is rotated by one turn to erase the electrostatic latent image and remove toners remained on the surface thereof and becomes ready for starting the copying step, the above mentioned operating mechanism causes the cleaning brush 16 to separate from the photosensitive drum 14 and at the same time the erasion lamp 15 becomes OFF.

During the preparatory operation from the ON operation of the electric source switch 7 to the end of one rotation of the photosensitive drum 14, a sheet manuscript is disposed on the manuscript carriage 2 and slidably moved along the edge guide 5 toward the light exposure portion 3 until the front end thereof functions to operate a first microswitch 24.

The first microswitch 24 functions to rotate through a clutch mechanism (not shown) a manuscript feed driving roller 25, thereby rotating a driven roller 26 and holding the front end of the sheet manuscript between the rollers 25, 26. As a result, the feed operation of the sheet manuscript is started. If the front end of the sheet manuscript causes a second microswitch 27 to operate, the above mentioned clutch mechanism is released. As a result, the manuscript feed driving roller 25 and driven roller 26 stop respective rotations to stop once the feed operation of the sheet manuscript held between the rollers 25, 26. This condition is maintained during the preparatory operation from the ON operation of the electric source switch 7 to the end of one turn of the photosensitive drum 14. As soon as this preparatory operation is completed, the above mentioned clutch mechanism becomes driven again to cause the manuscript feed driving roller 25 and driven roller 26 to start their sheet manuscript feed operation again.

The manuscript feed driving roller 25 is connected through the above mentioned clutch mechanism and a driving system (not shown) to the photosensitive drum 14 and rotated at a speed which is in synchronism with the peripheral speed of the photosensitive drum 14 to feed the sheet manuscript.

If the feed operation of the sheet manuscript is started again, a fluorescent lamp 28 incorporated into the main body 1 and illuminating the manuscript becomes ON. As a result, the sheet manuscript passing along a stage glass 29 is exposed to light. A light image of the manuscript scanned by the exposed light is projected through a projecting optical system 30 to the photosensitive drum 14. In the present embodiment, the projection optical system 30 is composed of a converging optical fiber array. As a result, the manuscript illumination fluorescent lamp 28 may be composed of a slit-shaped fluorescent lamp having a high brightness and generating no high temperature heat, for example, and arranged near the manuscript scanning surface of the stage glass 29.

The projection optical system 30 is provided at that side which is opposed to the fluorescent lamp 28 with a concave reflecting mirror 31 for illuminating the scanning surface of the stage glass 29 with a condensed light, thereby ensuring a required brightness and illuminating the scanning surface without casting a shadow thereon.

The sheet manuscript passed over the stage glass 29 and scanned by the exposed light is held between a manuscript discharge driving roller 32 adapted to be normally rotated as soon as the power switch 7 shown in FIG. 1 is made ON and a driven roller 33 and discharged onto the manuscript discharge tray 4.

During the lapse of time in which the sheet manuscript once stopped at the second microswitch 27 is fed again and discharged onto the manuscript discharge tray 4, the photosensitive drum 14 which has completed the above mentioned preparatory operation is rotated in a continuous manner and the surface thereof is uniformly charged with a flow of corona ions directed from a corona discharge device 34 arranged near the periphery thereof and then illuminated with the light image directed from the projection optical system 30 to produce on the surface thereof an electrostatic latent image corresponding to the manuscript image.

This electrostatic latent image is developed into a visible toned image by means of a developing device 35 arranged near the periphery of the photosensitive drum 14. In the present embodiment, the developing device 35 makes use of a magnet brush developing system using a developing agent formed of two compositions. The developing device 35 comprises a container 36 in which are arranged a magnet roller 37 rotatable in a direction shown by an arrow and applying toner particles to the photosensitive drum 14, a mixing blade 39 for mixing the toner particles with carriers in a developing agent 38, a doctor blade 40 for restricting the length of bar-shaped developing agent 38 adhered to the magnet roller 37 and a scraper 41 for scraping off the developing agent 38 which has completed its developing action and adhered to the magnet roller 37. On the container 36 is detachably mounted or made integral therewith a toner supplying container 42 containing toner particles 42 and provided at its lower end with a knurled roller 44. The knurled roller 44 is rotated so as to supply the toner particles 42 to the developing container 36 and hence always maintain any desired concentration of the toner particles in the developing agent 38.

In order to develop the electrostatic latent image on the photosensitive drum 14 without deteriorating it, the carrier of the developing agent 38 may be of one having a high resistance or the magnet roller 37 may be provided around its periphery with an insulating sleeve and either one of the magnet roller 37 and the insulating sleeve is rotated such that the developing agent 38 adhered to the photosensitive drum 14 is moved in a direction opposed to the rotating direction of the photosensitive drum 14.

The developing device 35 may eventually be provided with a developing electrode. In this case, a variable developing bias voltage is applied between the developing electrode and the photosensitive drum 14 so as to control the developing concentration.

The toned image produced on the photosensitive drum 14 by means of the developing device 35 is transferred at a transfer portion to a record sheet by means of a transfer roller 45 urged against the photosensitive drum 14 under a suitable pressure. The transfer roller 45 is formed of an electrically semiconductive resilient material. Between the transfer roller 45 and the photosensitive drum 14 is applied a suitable bias voltage having the same polarity as that of the electrostatic latent image for the purpose of forming an electric field which can transfer the toned image to the record sheet without damaging the electrostatic latent image on the photosensitive drum 14.

As described above, record sheets 46 are enclosed in the cassette 12 and superimposed one upon the other. These record sheets 46 are fed from the cassette 12 one by one by means of a pick-up roller 47 at a timing which is suitable for transferring the toned image to the record sheet 46 by the transfer roller 45. The sheet pick-up roller 47 is rotatably mounted on an arm 49 which can rotate about a supporting shaft 48 in opposite directions shown by arrows and urged against the record sheet 46 in the sheet feed cassette 12 at the above mentioned timing so as to supply it. The main body 1 is provided with a record sheet detecting sensor 50 for detecting presence or absence of the record sheet 46 in the cassette 12 mounted on the main body 1. The record sheet 46 supplied from the cassette 12 by means of the sheet supply roller 47 passes along a sheet guide 51 and is held between register rollers 52 and 53 which function to precisely correct the timing and feed speed of the record sheet 46. Then, the record sheet 46 passes along a sheet guide 54 and is fed between the photosensitive drum 14 and the transfer roller 45, thereby transferring the toned image produced on the photosensitive drum 14 to the record sheet 46.

The record sheet with the toned image transferred thereon is peeled off the photosensitive drum 14 by means of a peeling claw 55 and the flow of air sent through the duct 19 from the above mentioned fan 17. The peeled off record sheet passes along a sheet guide 56 and between a pair of feed rollers 57, 58 and through a record sheet feed path and is fed into the fixing devices 20, 20 arranged above and below the record sheet feed path. In the record sheet feed path between the transfer roller 45 and the feed rollers 57, 58 are arranged record sheet detecting sensors 59, 59 for detecting a jam of the record sheet.

As described above, as soon as the main switch 7 shown in FIG. 1 is made ON, the heaters 21 of the fixing devices 20 are energized to raise the temperature during the above mentioned preparatory operation and copying operation to a sufficiently high fixing temperature by the time that the record sheet on which the toned image is transferred reaches to the fixing devices 20. Subsequently, the fixing temperature is maintained at a suitable value by means of a control device (not shown). The heater is composed of a resilient zigzag shaped-wire extending along the record sheet feed path. Such zigzag shaped-wire can absorb its thermal expansion by its resilient bent portion and hence is prevented from being hung down.

After the fixing operation, the record sheet is discharged onto the copy discharge tray 13 by means of a pair of discharge rollers 60, 61. In the record sheet feed path between the fixing device 20 and the discharge rollers 60, 61 is arranged a record sheet detecting sensor 62 for detecting jam of the record sheet.

As soon as the electric source switch 7 shown in FIG. 1 is made ON, either one or both pairs of feed rollers 57, 58 and discharge rollers 60, 61 become normally rotated.

After the transfer step, the photosensitive drum 14 is further rotated to repeat the developing and transfer steps only, and as a result, a desired number of copies, in the present embodiment, at most 20 copies may be obtained on the basis of the same electrostatic latent image once produced on the photosensitive drum 14. In the case of obtaining a plurality of copies from one manuscript, the cleaning brush 16 is separated from the photosensitive drum 14 and the erasion lamp 15, manuscript illumination fluorescent lamp 28 and corona discharge device 34 are kept under their inoperative condition. In the present embodiment, the manuscript illumination fluorescent lamp 28 is made ON during a period from starting the feed of the manuscript to the end of one rotation of the photosensitive drum 14. Immediately after the last transfer step of the final copy of the desired number of copies, the cleaning brush 16 is brought into contact with the photosensitive drum 14 and the erasion lamp 15 is made ON. As a result, the toner particles and electrostatic latent image remained on the photosensitive drum 14 are erased so as to make the photosensitive drum 14 ready for the next copying step. In this case, if the next manuscript is not inserted into the light exposure portion 3, the photosensitive drum 14 is rotated for a given number of turns after the final transfer step and then is stopped and at the same time the rotation of the fan 17 is also stopped.

During the above mentioned step of obtaining a plurality of copies, if the next sheet manuscript is inserted into the light exposure portion 3, this sheet manuscript functions in the same manner as in the case of the preparatory operation. That is, the front end of the sheet manuscript causes the first microswitch 24 to operate and is held between the manuscript feed driving and driven rollers 25 and 26 and then causes the second microswitch 27 to operate. Then, the sheet manuscript stands ready for completion of the step of obtaining a plurality of copies of the preceding manuscript. The final transfer step of obtaining a plurality of copies of the preceding manuscript is started and the toner particles and the electrostatic latent image remained on that part of the photosensitive drum 14 at which the transfer step has been effected are erased by the cleaning brush 16 and erasing lamp 15.

If this cleaned portion arrives at the corona discharge device 34, it becomes operated to uniformly charge the photosensitive drum 14. Meanwhile, the next sheet manuscript standing ready for its feed operation is fed by the manuscript feed driving and driven rollers 25 and 26 such that the next sheet manuscript passes over the stage glass 29 in synchronism with that movement of the uniformly charged portion of the photosensitive drum 14 which arrives at the position of the projection optical system 30. As a result, the next sheet manuscript is scanned by the exposed light in the same manner as described above. Thus, it is possible to obtain copies for a plurality of manuscripts without interruption. After the rear end of the preceding manuscript arrives at the light exposure portion 3, the operator can insert the next manuscript after a sufficient time.

In the present embodiment, the dial 8 for determining the number of copies shown in FIG. 1 is of fixed one which is not automatically returned to its original position and the number of copies set beforehand is memorized in the apparatus during a formation of a first copy. As a result, in the case of obtaining a plurality of copies from a plurality of manuscripts, if it is desired to change the number of copies from the next manuscript, it is possible to set the number of copies of the next manuscript when the next manuscript is waiting for its feed operation at the light exposure portion 3 or when the copies of the preceding manuscript are preparing.

If the dial 8 for determining the number of copies has been erroneously set to that number which is larger than the desired number of copies and the step of obtaining a plurality of copies has been started, when the step of obtaining the copy corresponding to the desired order of copy is started, the stop button 9 is shown in FIG. 1 is pushed. Then, after the end of this step of obtaining this copy results in the end of the step of obtaining the desired number of copies.

As can be seen from the above, in the electrophotographic apparatus according to the present embodiment, if the electric source switch 7 is made ON to complete the preparatory operation required for rotating the photosensitive drum 14 by one turn, then it is possible to obtain one copy everytime the photosensitive drum is rotated by one turn. In the case of obtaining respective one copy from a plurality of manuscripts, if the manuscript from the second on is inserted into the light exposure portion 3 before the end of one turn of the photosensitive drum 14 for the preceding manuscript, the manuscript from the second on once assumes a wait attitude and is fed as soon as the photosensitive drum completes its one turn for forming a copy of the preceding manuscript to start the step of obtaining a copy for the next document. As a result, in this case also it is possible to obtain copies without interruption. In this way, in the case of obtaining one copy, if the next manuscript is inserted into the light exposure portion after one turn of the photosensitive drum 14 for the preceding manuscript, the copying step of this next manuscript is started when the front end thereof causes the second microswitch 27 to operate. In the case of obtaining a plurality of copies from a plurality of manuscripts, respectively, if the next manuscript is inserted into the light exposure portion 3 after the final copying step for the preceding manuscript, the copying step for this manuscript is started when the front end thereof causes the second microswitch 27 to operate.

The above mentioned electrophotographic apparatus according to the invention is capable of obtaining any desired number of copies by passing the sheet manuscript only one time along the rectilinear sheet feed path. As a result, the apparatus is simple in copying operation and an opportunity of damaging the precious manuscript becomes extremely small. In the case of obtaining one copy and a plurality of copies from a plurality of sheet manuscripts, respectively, it is possible to obtain such number of copies without interruption, so that the apparatus is extremely high in efficiency.

Figure 3:
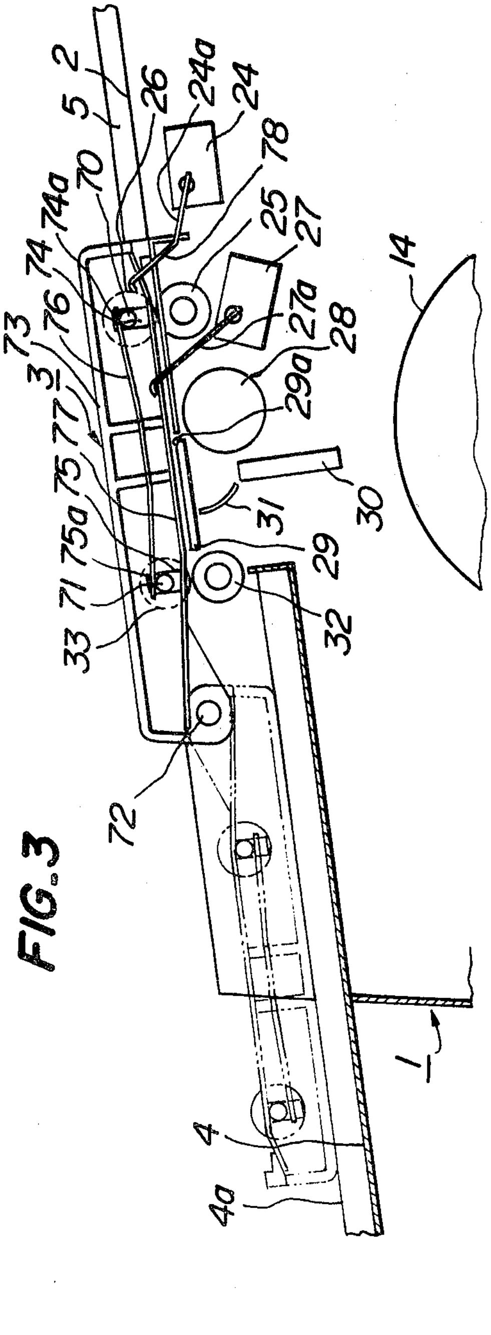
FIG. 3 is a diagrammatic cross-sectional view showing in detail the light exposure portion shown in FIG. 2.

FIG. 3 shows the light exposure portion 3 shown in FIGS. 1 and 2 in greater detail. The manuscript feed driving roller 25 is composed of a plurality of spaced apart larger diameter rollers to be described later and rotatably journaled in the main body 1 and connected through a clutch mechanism (not shown) to a driving system. The manuscript discharge driving roller 32 is also rotatably journaled in the main body 1, but is directly connected to the driving system with the clutch mechanism omitted. As described above, if the electric source switch 7 (FIG. 1) is made ON, the roller 32 becomes normally rotated.

The manuscript feed driven roller 26 and discharge driven roller 33 are composed of a plurality of rollers rotatably mounted on roller shafts 70 and 71, respectively. The roller shafts 70 and 71 are slidably engaged with bearing grooves 74 and 75 provided in a supporting body 73 rotatably mounted through a supporting shaft 72 on the main body 1. In the embodiment shown in FIG. 3, the supporting body 73 is composed of a rectangular casing open at its lower end and closed by an upper side manuscript guide member 77. The manuscript feed driven roller 26 and discharge driven roller 33 are urged against the manuscript driving roller 25 and discharge driving roller 32 by means of a leaf spring 76 under the condition shown in FIG. 3.

The supporting shaft 72 is located substantially on an extension line drawn from a rectilinear manuscript feed path formed by the manuscript feed driving and driven rollers 25 and 26 and manuscript discharge driving and driven rollers 32 and 33. The manuscript discharge tray 4 is provided with an edge 4*a* located at a position which is lower than the above mentioned extension line from the manuscript feed path by the thickness of the supporting body 73. As a result, if the supporting body 73 is rotated about the supporting shaft 72 by substantially 180° to deposit it on the edge 4*a* of the manuscript discharge tray 4 as shown by dot and dash lines in FIG. 3, the manuscript feed driven roller 26 and discharge driven roller 33 are substantially aligned with the extension line drawn from the manuscript feed driving roller 25 and discharge driving roller 32 to provide a thick manuscript feed path to be described later.

The supporting shafts 72, 72 and bearing members of the supporting body 73 rotatably supported by the supporting shafts 72, 72 are spaced apart from each other as viewed in a direction perpendicular to the manuscript feed direction by a distance which is sufficient to permit the thick manuscript to pass therethrough. In the full line position shown in FIG. 3, the supporting body 73 is closed at its lower surface by the upper side manuscript guide member 77 which is spaced apart from the stage glass 29 and from a lower side manuscript guide member 78 provided near the manuscript feed driving roller 25 to form a gap for defining the sheet manuscript feed path. The manuscript feed driven roller 26 and discharge driven roller 33 are projected from the upper side manuscript guide 77, so that in the position of the supporting body 73 shown by dot and dash lines in FIG. 3 the upper side manuscript guide 77 functions to prevent the roller shafts 70 and 71 from removing out of the bearing grooves 74 and 75, respectively. The lower surface of the upper side manuscript guide member 77, that is, the surface opposed to the projection optical system 30 when the supporting body 73 is located at the full line position shown in FIG. 3 is provided at least that range which corresponds to the effective picture surface of the projection optical system 30 with a white color painted portion having a reflecting power which is the same as that of a manuscript which is substantially white in color. The depth of the bearing grooves 74 and 75 from the upper side manuscript guide 77 to respective bases 74*a* and 75*a* are determined such that in the case of feeding the thick manuscript with the supporting body 73 located at the position shown by dot and dash lines in FIG. 3 even if the manuscript feed driven roller 26 and discharge driven roller 33 are pushed downwardly against the action of the leaf spring 76, these rollers 26 and 33 are slightly projected from the upper side manuscript guide 77.

Figure 5:
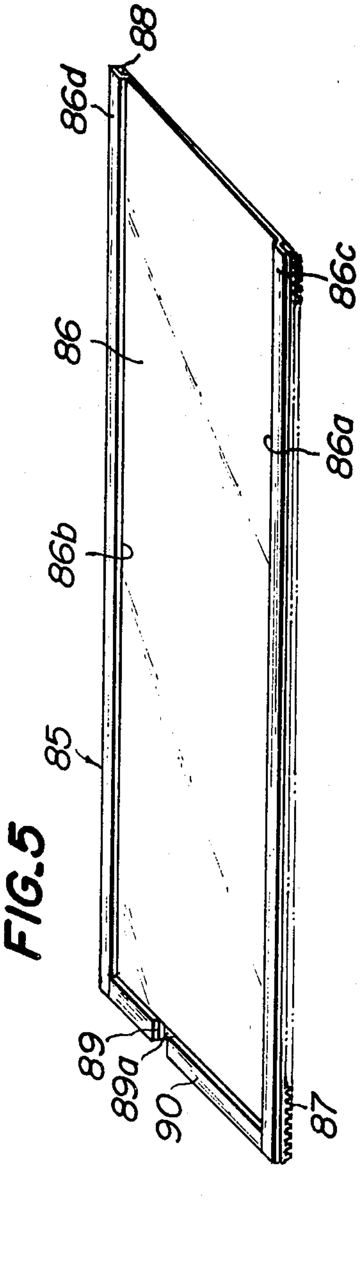
FIG. 5 is a perspective view of one embodiment of a thick manuscript carriage used in the case of obtaining copies of the thick manuscript by the electrophotographic apparatus according to the invention.

The thick manuscript feed mechanism for the electrographic apparatus according to the invention will now be described in greater detail with reference to FIGS. 4 5 and 6.

Figure 4:
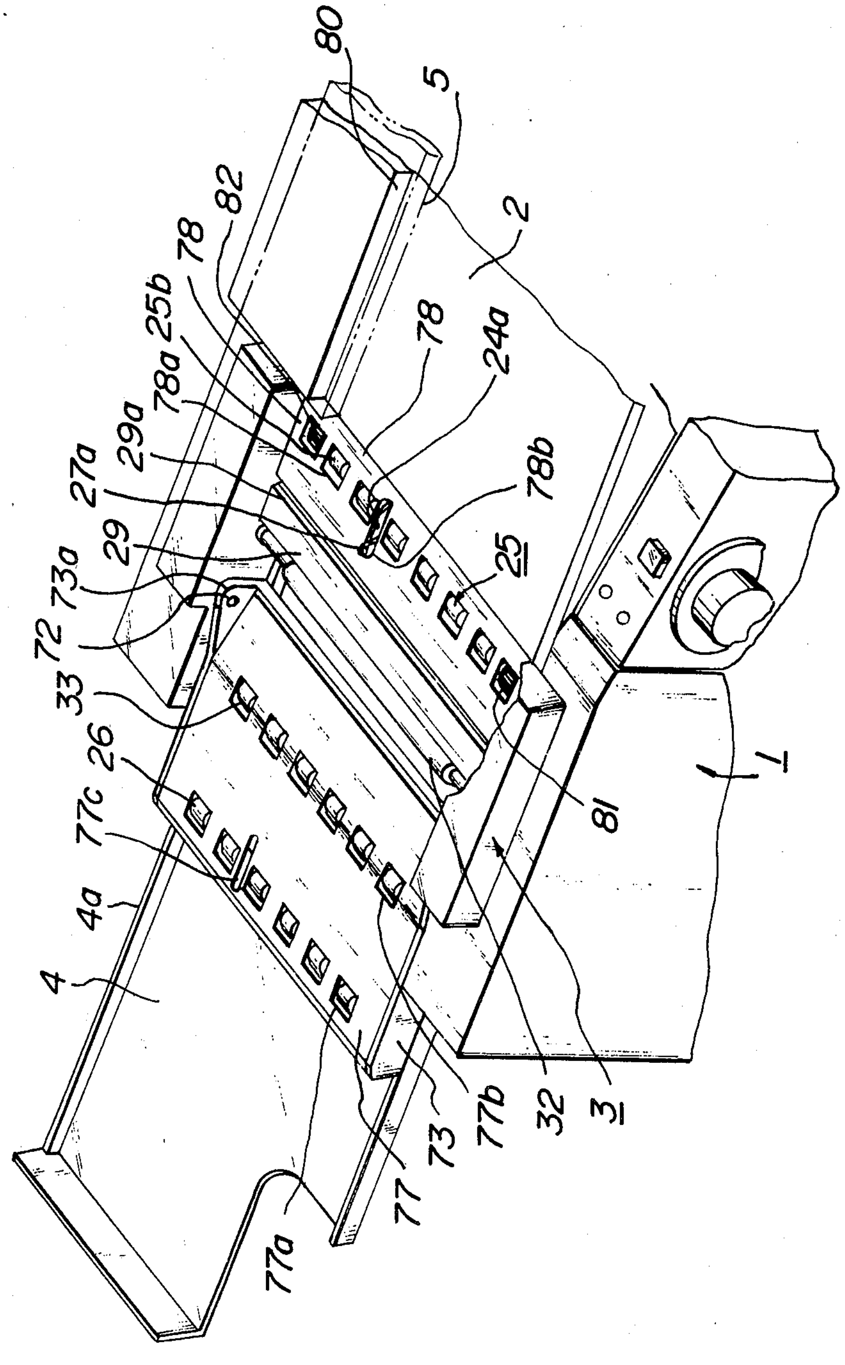
FIG. 4 is a perspective view showing the supporting body shown in FIG. 3 and rotated by 180° so as to form a rectilinear manuscript feed path used in the case of obtaining copies of a thick manuscript.

FIG. 4 shows the supporting body 73 rotated about the supporting shaft 72 and disposed inside out on the edge 4*a* of the manuscript discharge tray 4 so as to obtain copies of the thick manuscript. FIG. 5 shows one embodiment of the thick manuscript carriage adapted to dispose the thick manuscript thereon and carry it. FIG. 6 shows the mode of the thick manuscript carriage during its feeding on the manuscript feed driving roller 25.

In the case of obtaining copies of the thick manuscript, the sheet manuscript edge guide 5 shown by dot and dash lines in FIG. 4 is slidably moved rearwardly as viewed in FIG. 4 to provide a thick manuscript edge guide 80. A method of changing over the edge guides 5 and 80 one from the other will be described in greater detail. Instead of slidably changing over the sheet manuscript edge guide 5 to the thick manuscript edge guide 80, the sheet manuscript edge guide 5 may be removed or rotated upwardly.

The manuscript feed driving roller 25 is composed of several short rubber rollers 25*b* spaced apart from each other and secured to a driving shaft 25*a* rotatably journaled in the main body 1 and a pair of thick manuscript feed pinion gears 81 and 82 secured to those portions of the driving shaft 25*a* which lie outside the rubber rollers 25*b*. The total length of the group of rubber rollers 25*b* is made one which is sufficient to feed a sheet manuscript having a maximum copy width allowable by the electrographic apparatus according to the present invention. The pinion gears 81 and 82 are arranged at those positions which do not prevent passage of the above mentioned sheet manuscript having the maximum copy width.

The pinion gears 81 and 82 each has a pitch circle whose diameter is equal to a diameter of the rubber roller 25*b*. That is, if the thick manuscript is disposed on the thick manuscript carriage shown in FIG. 5 and fed, the speed of the thick manuscript is made equal to the feed speed of the sheet manuscript and to the peripheral speed of the photosensitive drum 14 (FIG. 2). In addition, the pinion gears 81 and 82 are secured to the driving shaft 25*a* such that respective gear teeth are aligned with each other.

A part of the outer periphery of each of the rubber rollers 25*b* and pinion gears 81, 82 for constituting the manuscript feed driving roller 25 is projected from the upper surface of the lower side manuscript guide 78 through a window 78*a* provided therein. The rubber rollers 25*b* and pinion gears 81, 82 are projected such that the upper end of a tooth base circle of the pinion gears 81, 82 is aligned with the upper surface of the lower side manuscript guide 78 or is made slightly higher than the latter. The rear end of the window 78*a* as viewed in the feed direction of the manuscript is slightly bent downwardly or subjected to chamfering working for the purpose of preventing the front end of the sheet manuscript from engaging with the rear end of the window 78*a*.

The lower side manuscript guide 78 is provided at its center part with a window 78*b* through which are projected actuators 24*a* and 27*a* of the first and second microswitches 24 and 27, respectively.

The upper surface of the stage glass 29 is substantially aligned with the upper surface of the lower side manuscript guide 78. Between the upper surface of the stage glass 29 and the lower surface of the upper side manuscript guide 77 is formed the sheet manuscript feed path along which the sheet manuscript is fed. The upper surface of the stage glass 29 is located at a position which is near the lower side of the image surface of the projection optical system 30, that is, within a depth of field at the object side corresponding to the surface of the photosensitive drum 14. That is, the upper surface of the stage 29 is located at such position that when copies of the sheet manuscript are obtained there is no risk of out of focus being induced even when the sheet manuscript is raised from the upper surface of the stage glass 29 and fed along the lower surface of the upper side manuscript guide 77 and that when copies of the thick manuscript are obtained there is no risk of out of focus being induced even when the thick manuscript is disposed on the thick manuscript carriage shown in FIG. 5 and fed along a path which is higher than the sheet manuscript path by the thickness of the thick manuscript carriage. In order to prevent the front end of the sheet manuscript from catching the stage glass 29, that edge 29*a* of the stage glass 29 with which the manuscript makes at first contact is subjected to the chamfering working. In addition, the stage glass 29 is detachably mounted on the main body 1 so as to clean the illumination fluorescent lamp 28, projection optical system 30, reflecting mirror 31 or the like arranged below the stage glass 29.

The manuscript feed driven roller 26 is opposed to the rubber roller 25*b* of the manuscript feed driving roller 25 and projected through a window 77*a* provided in the upper side manuscript guide 77. The manuscript discharge driven roller 33 in common with the manuscript feed driven roller 26 is composed of a plurality of short-rollers each projected through a window 77*b* provided in the upper side manuscript guide 77. When copies of the sheet manuscript are obtained, the upper side manuscript guide 77 is provided at that portion thereof which corresponds to the window 78*b* provided in the lower side manuscript guide 78 with a window 77*c*.

The front and rear edges of the upper side manuscript guide 77 as viewed in the manuscript feed direction are so inclined that the sheet and thick manuscripts can be fed in a smooth manner.

A bearing portion 73*a* for rotatably supporting the supporting body 73 and the supporting shaft 72 are located outside the extension line drawn from the thick manuscript edge guide 80 as shown in FIG. 4 so as not to prevent the feed of the thick manuscript carriage to be described later.

The thick manuscript carriage will now be described in greater detail with reference to FIGS. 5 and 6. In the present embodiment, a thick manuscript carriage 85 is composed of a light transmission plate 86 adapted to dispose a thick manuscript thereon, raised edges 86*a* and 86*b* provided at both sides of the light transmission plate 86 and opposed in widthwise direction thereof and rack supporting edges 86*c* and 86*d* extending in parallel with the light transmission plate 86 and made integral with the raised edges 86*a* and 86*b*, respectively. All of these plate and edges are formed of light transmission plastics having a uniform thickness and made integral into one body. The rack supporting edges 86*c* and 86*d* are provided at their lower surfaces with racks 87 and 88 with their teeth facing downwardly, respectively.

The light transmission plate 86 has a thickness t which is sufficient to make it mechanically strong and maintain its flatness within a range of the depth of field of the projection optical system 30 even when the manuscript surface is raised from the upper surface of the stage glass 29 by an optical thickness of $t/n$ where n is the refractive index of the light transmission plate 86. Such light transmission plate 86 may be formed of a transparent acryl plate having a thickness of 1 mm.

The distance between the opposed raised edges 86*a* and 86*b*, that is, the width of the light transmission plate 86 is of one which permits a thick manuscript having a maximum copy width allowable by the electrographic apparatus according to the invention to be disposed thereon.

The light transmission plate 86 is provided at one of ends in the lengthwise direction thereof with a raised end edge 90 for determining the position of the front end of the thick manuscript in its feed direction. The raised end edge 90 is partly broken away to form a notch 89.

The notch 89 is located at a position which corresponds to the actuators 24*a* and 27*a* of the first and second microswitches 24 and 27 and the base 89*a* of the notch 89 is aligned with the front end of the thick manuscript which makes contact with the raised end edge 90. The height of the raised end edge 90 is so determined that when an open book, for example, is disposed on the light transmission plate 86 its thick cover does not make contact with the raised end edge 90.

The teeth of the racks 87 and 88 are aligned with each other in a direction perpendicular to the lengthwise direction of the light transmission plate 86. The total length of the racks 87 and 88 is determined such that the racks 87 and 88 engage with the pinion gears 81 and 82, respectively, until the rear end of the thick manuscript having a maximum copy length allowed by the apparatus according to the invention passed through the effective picture surface of the projection optical system 30.

The height of the teeth of the racks 87 and 88 is so determined that the pitch line thereof is aligned with the lower surface of the light transmission plate 86.

Figure 6:
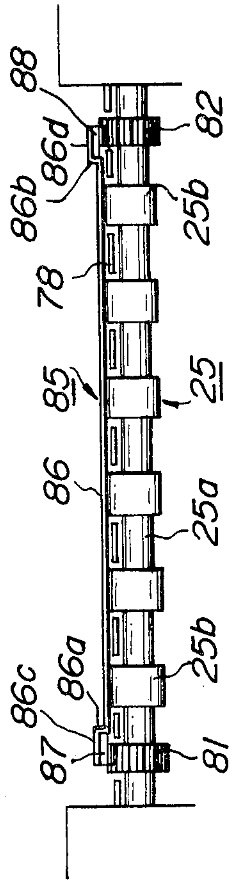
FIG. 6 is a front elevational view showing a relation between the thick manuscript carriage shown in FIG. 5 and a manuscript feed driving roller and pinion gears shown in FIG. 4, partly shown in section.

As shown in Fig. 6, if the thick manuscript carriage 85 is disposed on the manuscript feed driving roller 25 so as to bring the racks 87 and 88 into engagement with the pinion gears 81 and 88 provided at both ends of the manuscript feed driving roller 25, a contact line between the rubber roller 25*b* of the manuscript feed driving roller 25 and the lower surface of the light transmission plate 86 is aligned with the pitch line where the pinion gears 81 and 82 engage with the racks 87 and 88, respectively. As a result, the peripheral speed of the rubber roller 25*b* is equal to that of the pitch circle of the pinion gears 81, 82, so that the thick manuscript carriage 85 is smoothly fed at a given speed.

If the racks 87 and 88 are formed of plastic casting obtained by the same mold, it is possible to align these teeth by merely aligning one end of the racks 87 and 88 with the end of the rack supporting edges 86*c* and 86*d*. In addition, the thick manuscript carriage 85 composed of the light transmission plate 86, racks 87, 88, notch 89 and raised end edge 90 may be formed of transparent plastics and made integral into one body.

The operation of obtaining copies of the thick manuscript by means of the above mentioned thick manuscript carriage 85 will now be described with reference to FIGS. 2 to 6.

In the first place, a thick manuscript to be copied is disposed on the light transmission plate 86 of the thick manuscript carriage 85 with the manuscript surface faced downwardly and the front and side edges of the manuscript are brought into contact with the raised end edge 90 and side edge 86*b*, respectively. Then, the thick manuscript is urged against the thick manuscript carriage 85 such that the thick manuscript is closely adhered to substantially total surface of the light transmission plate 86. The thick manuscript carriage 85 is slidably moved toward the light exposure portion 3 while the side edge of the thick manuscript carriage 85, that is, the side edge of the rack 88 slightly makes contact with the thick manuscript edge guide 80.

If the thick manuscript carriage 85 arrives at the light exposure portion 3, the base 89*a* of the notch 89 causes the actuator 24*a* of the first microswitch 24 to push, thereby starting the rotation of the manuscript feed driving roller 25. Then, the racks 87 and 88 are brought into engagement with the pinion gears 81 and 82, respectively, thereby starting the feed of the thick manuscript carriage 85.

If the pinion gears 81, 82 cause the thick manuscript carriage 85 to feed, the base 89*a* of the notch 89 is urged against the actuator 27*a* of the second microswitch 27, thereby once stopping the feed of the carriage 85. Then, similar to the above described operation of obtaining copies of the sheet manuscript, the carriage 85 is fed again in response to the given timing of the copying step. At the same time, the manuscript illumination fluorescent lamp 28 is made ON to project the image of the thick manuscript disposed on the thick manuscript carriage 85 through the stage glass 29 and projection optical system 30 onto the photosensitive drum 14.

The front end of the thick manuscript carriage 85 which has passed over the stage glass 29 rides on the manuscript discharge driving roller 82 and is fed by it onto the manuscript discharge driven roller 33 and manuscript feed driven roller 26 in the order as mentioned above. At this time, the rear half-portion of the thick manuscript is still scanned by the exposed light. As described above, the thick manuscript feed path composed of the manuscript feed driving roller 25, manuscript discharge driving roller 32, manuscript discharge driven roller 33 and manuscript feed driven roller 26 makes one flat plane, so that the thick manuscript carriage 85 is effectively fed along this thick manuscript feed path. As a result, the image of the thick manuscript disposed on the thick manuscript carriage 85 is not deviated from the depth of field of the projection optical system 30 and hence is effectively projected onto the photosensitive drum 14.

As described above, the thick manuscript carriage 85 is fed by mutual engagement between the racks 87 and 88 on the one hand and the pinion gears 81 and 82 on the other hand. As a result, if the thick manuscript carriage 85 is urged against the thick manuscript feed path under a pressure which is sufficient to prevent disengagement between the racks and the pinion gears, it is possible to feed the thick manuscript carriage 85 in an extremely positive manner. In addition, the engagements between the racks 87, 88 and the pinion gears 81, 82 are effected at the left and right sides with respect to the feed direction of the thick manuscript carriage. In addition, the feed speeds at the left and right sides of the thick manuscript carriage are equal with each other, so that there is no risk of the thick manuscript carriage being inclined during its feed. The thick manuscript carriage 85 may be urged against the thick manuscript feed path under a pressure which is on the order of preventing the thick manuscript from floating as in the case of the conventional copying machines. As a result, in the case of obtaining copies of the thick manuscript by means of the electrophotographic apparatus according to the present invention, the operator can urge the thick manuscript against the thick manuscript carriage 85 for the purpose of preventing the thick manuscript from floating up and feed the carriage 85 in conformity with the operation of the electrophotographic apparatus, thereby effecting the copying operation in a positive manner.

As described above, the electrophotographic apparatus according to the invention is capable of obtaining any desired number of copies of the manuscript by scanning it only one time by the exposed light. As a result, during the step of obtaining a plurality of copies, the apparatus as a whole is made light tight such that the electrostatic latent image produced on the photosensitive drum 14 is effectively maintained, that is, the surface of the photosensitive drum 14 is prevented from being illuminated with any exterior light. This light tight property of the apparatus can effectively be maintained when copies of the sheet manuscript are obtained by the supporting body 73 covering the light exposure portion 3. But, in the case of obtaining copies of the thick manuscript, the supporting body 73 is rotated about the supporting shaft 72 to the position shown by dot and dash lines in FIG. 3. As a result, after the passage of the thick manuscript any exterior light can pass through the projection optical system 30 without hindrance. As a result, there is a risk of the electrostatic latent image once produced on the photosensitive drum 14 being erased by the incident exterior light. In practice, the exterior light on the order of indirect indoor illumination light does exert substantially no adverse effect upon the electrostatic latent image. But, a light source, etc. for indoor illumination arranged directly above the electrophotographic apparatus does exert a remarkably adverse effect upon the electrostatic latent image.

An embodiment for obtaining a plurality of copies from a thick manuscript under the above mentioned condition will now be described with reference to FIG. 7.

Figure 7:
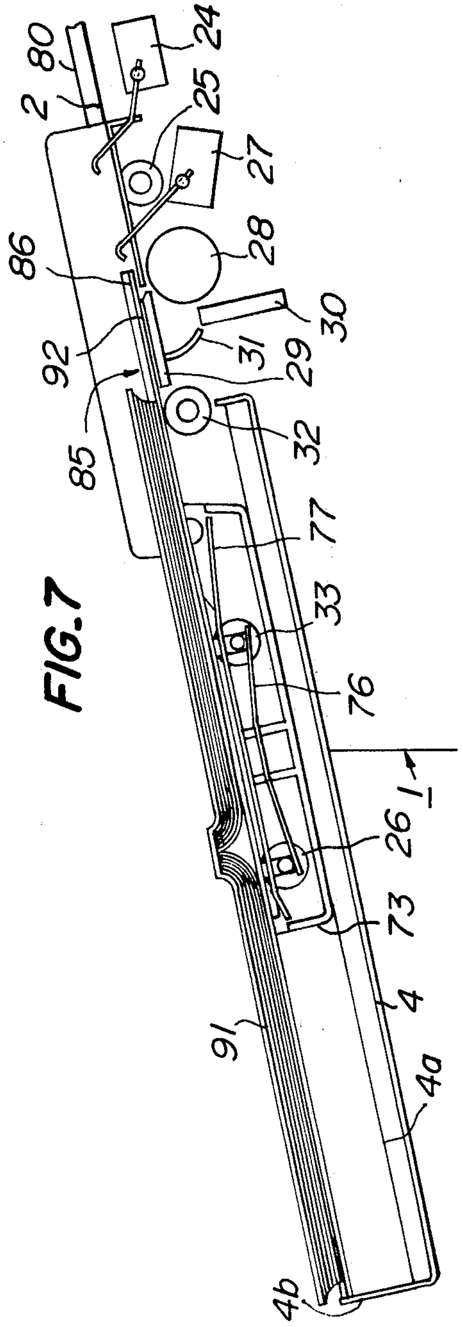
FIG. 7 is a diagrammatic cross-sectional view of another embodiment of a thick manuscript carriage used in the case of obtaining copies of the thick manuscript by the electrophotographic apparatus according to the invention.

FIG. 7 shows a condition under which the thick manuscript disposed on the thick manuscript carriage has been scanned by the exposed light. In the present embodiment, the manuscript discharge tray 4 is provided at its front end as viewed in the feed direction of the manuscript with a stopper 4*b* which makes contact with the front end of a thick manuscript carriage 85 of a thick manuscript 91 which has been scanned by the exposed light and which functions to stop the feed of the thick manuscript carriage 85. Under such condition, the rear end portion of a light transmission plate 86 of the thick manuscript carriage 85 is provided at that portion which is opposed to the stage glass 29 with a light interruption portion 92 formed by a light interruption treatment such, for example, as a black paint coating.

As a result, after the thick manuscript 91 has been scanned by the exposed light, the light interruption portion 92 functions to interrupt the incident exterior light onto the projection optical system 30. If this condition is maintained until the step of obtaining a plurality of copies is completed, the electrostatic latent image produced on the photosensitive drum 14 is effectively maintained, thereby obtaining any desired number of copies without deteriorating the picture quality. If the stopper 4*b* is too high, there is a risk of the stopper 4*b* being struck by the thick cover of books etc. and of the manuscript being displaced. As a result the height of the stopper 4*b* is made slightly higher than the thick manuscript carriage 85.

The thick manuscript carriage 85 may be provided with a reflecting member having a reflective coefficient similar to that of a white manuscript surface at that portion of the lower surface of the transparent plate 86 which is beyond an area on which the thick manuscript 91 is placed. By means of such a reflecting member it is possible to prevent undesired toners from being adhered to that portion of the photosensitive drum or the record paper which does not retain the electrostatic charge latent image or the toned image corresponding to the manuscript.

Figure 8A:
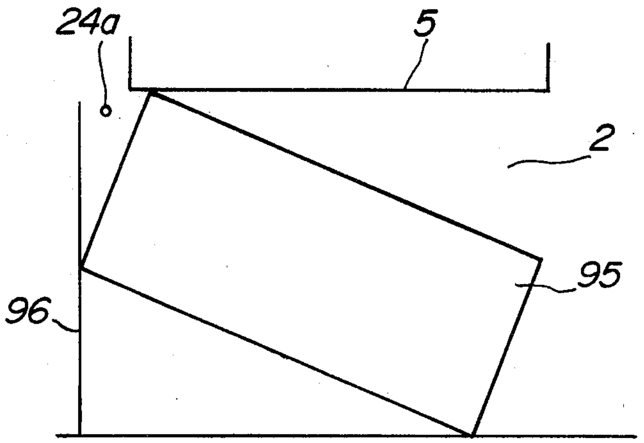
FIGS. 8A and 8B are schematic plan views showing a manuscript carriage for explaining an operation of a manuscript detecting device.
Figure 8B:
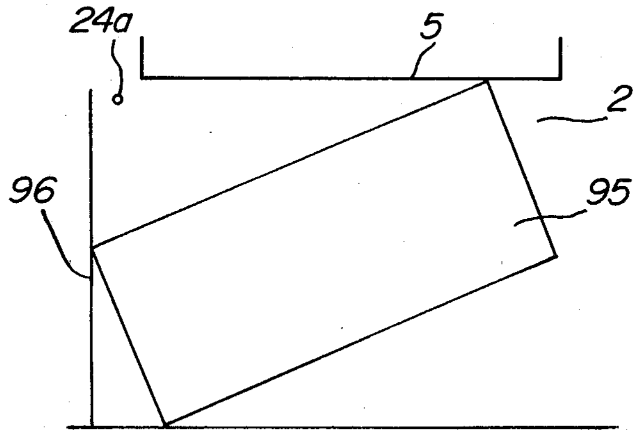

As stated hereinbefore, the electrophotographic apparatus according to the invention has a number of advantages. In the first place, the apparatus is simple and compact in construction. Secondly, it is possible to obtain a plurality of copies of a sheet manuscript and thick manuscript by scanning such manuscript one time only by the exposed light, so that the apparatus can be manipulated with a high efficiency. Third, the use of substantially rectilinear manuscript feed path, one time exposure of light and obtainment of a plurality of copies ensure an extremely small rate of damaging the sheet manuscript. Fourth, since the manuscript feed path can easily be made open by rotating the supporting body 73, it is possible to confine the damage of the sheet manuscript to the minimum even when the light exposure portion 3 is clogged with the sheet manuscript. Fifth, since a combination of steps of obtaining copies renders it possible to effect the copying operation without interruption, particularly in the case of obtaining copies of the sheet manuscript the manuscript treatment becomes considerably high in efficiency if compared with the conventional electrophotographic apparatus for mainly obtaining copies of the thick manuscript. Sixth, even in the case of obtaining copies of the thick manuscript, the thick manuscript can be fed in a simple and precise manner and it is possible to obtain a plurality of copies by scanning the thick manuscript by one time only by the exposed light in the same manner as in the case of the sheet manuscript, whereby the apparatus can easily be operated in the same manner as the conventional electrophotographic apparatus for mainly obtaining copies of the thick manuscript in general. Finally, the use of the actuator **24*a* of the first microswitch 24 for detecting the manuscript inserted into the light exposure portion 3 and located immediately before the manuscript feed driving roller 25 and its driven roller 26 and substantially at the center in the widthwise direction of the manuscript effectively prevents the sheet manuscript from being fed under its inclined state. In order to cause the sheet manuscript clamped between the driving and driven rollers 25 and 26 the actuator 24*a* has to be pushed by the front edge of the sheet manuscript. If the sheet manuscript is inserted with being inclined with respect to the rollers, the front edge of the manuscript could not push the actuator 24*a* as shown in FIGS. 8A and 8B. Then the user adjusts an attitude of the manuscript so as to place its front edge substantially in parallel to the rollers, and as the result of this the manuscript can be clamped correctly between the rollers 25 and 26 and is transported in a stable manner. As can be seen from FIGS. 8A and 8B when consider the function of the edge guide 5 it is preferable to provide the actuator 24*a* nearer to the edge guide 5. When the sheet manuscript 95 is inserted with being inclined as shown in FIGS. 8A and 8B, one end of its front edge is urged against a contact line 96 between the rollers 25 and 26 and thus the actuator 24*a* could not be driven. Therefore the user inserts the sheet manuscript 95 with its side edge being in contact with the edge guide 5 and its front edge being in parallel with the contact line 96**.

The invention is not limited to the above described embodiments, but various modifications and alternations are possible. For example, as means for detecting the insertion of the sheet or thick manuscript into the manuscript feed path, use may be made of a photoelectric switch etc. instead of the microswitch.

In addition, in the case of obtaining copies of the thick manuscript, the supporting body 73 has been rotated about the supporting shaft 72 and disposed on the edge **4*a* of the manuscript discharge tray 4. But, the supporting body 73 may be disposed on the base surface of the manuscript discharge tray 4** or supported by a suitable stopper.

Alternatively, the manuscript discharge driving roller 32 composed of one elongated rubber roller may be composed of a plurality of short rubber rollers as in the case of the manuscript feed driving roller 25. Conversely, each of the manuscript feed driving roller 25, manuscript feed driven roller 26 and manuscript discharge driven roller 33 may be composed of an elongated rubber roller. In addition, use may be made of more than three pairs of the manuscript feed and discharge rollers instead of two pairs thereof. Similar to the manuscript feed driving roller 25, the manuscript discharge driving roller 32 may be provided at its each end with a pinion gear and hence it is possible to feed the thick manuscript carriage 85 with the aid of two pairs of pinion gears. The use of the two pairs of pinion gears ensures a reduction of the length of the racks 87 and 88 of the thick manuscript carriage 85. In this case, the pinion gears are required to be secured to the manuscript discharge driving roller 32 such that the teeth of the pinion gears are so adjusted in direction with respect to the teeth of the pinion gears 81 and 82 of the manuscript feed driving roller 25 that the racks 87 and 88 can correctly engage with these pinion gears.

Figure 9A:
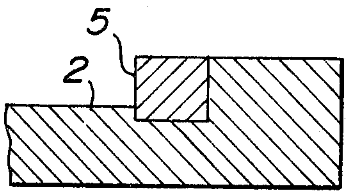
FIGS. 9A, 9B, 10A, 10B and 11A, 11B are cross-sectional views of three embodiments of means for changing over a sheet manuscript edge guide to a thick manuscript edge guide and vice versa, respectively.
Figure 9B:
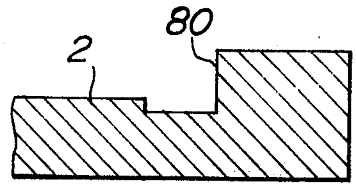

FIG. 9A shows an edge guide 5 detachably mounted on the manuscript carriage 2. In the present embodiment, instead of changing over the sheet manuscript edge guide 5 to the thick manuscript edge guide 80 by slidably displacing the former to the latter, the edge guide 5 is removed to provide the thick manuscript edge guide 80 as shown in FIG. 9B.

Figure 10A:
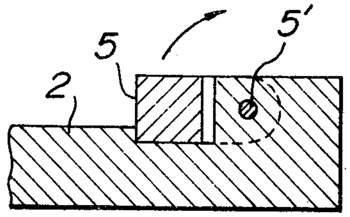
Figure 10B:
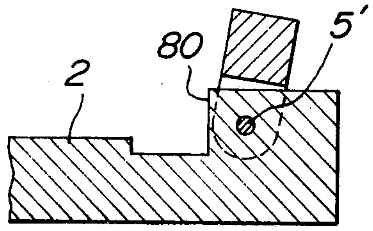

FIG. 10A shows an edge guide 5 rotatably mounted on the manuscript carriage 2. In the present embodiment, the edge guide 5 is rotated upwardly about a supporting shaft 5' to provide the thick manuscript edge guide 80 as shown in FIG. 10B.

In the embodiments shown in FIGS. 9A and 10A, the edge guide 5 is square in section.

Figure 11A:
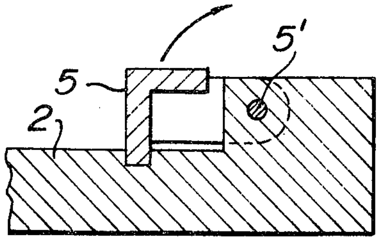
Figure 11B:
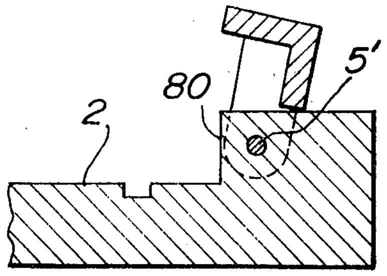

FIG. 11A shows an edge guide 5 which is L-shaped in section. In the present embodiment, the edge guide is also rotated upwardly about the supporting shaft 5' to provide the thick manuscript edge guide 80 as shown in FIG. 11B.

In addition, the feed mechanism for the thick manuscript carriage 85 may be composed of a pair of rack and pinion gear instead of two pairs of racks and pinion gears as described in the previous embodiment.

The racks 87, 88 may be arranged along the side surface of the thick manuscript carriage 85 and the corresponding pinion gears 81, 82 may be arranged at the side surfaces of the light exposure portion 3 or supporting body 73. In this case also, use may be made of a pair of rack and pinion gear. Instead of using the rack-pinion gears, use may be made, for example, of a rack-helical gear, perforation-sprocket wheel, magnet tape-magnet roller and the like. In addition, instead of using the seamless photosensitive drum 14, use may be made of a seamed photosensitive drum or screen photosensitive body for the purpose of effecting operation of obtaining desired copies. In this case, it is preferable to control each operation by means of a signal emitted in synchronism with the rotation of the photosensitive body.

In the case of obtaining copies of the thick manuscript, the supporting body 73 may be removed from the manuscript feed path or may be rotated toward a direction perpendicular to the manuscript feed direction. In addition, the supporting body 73 may be rotated toward the manuscript carriage 2 so as to provide a rectilinear thick manuscript feed path. Alternatively, the manuscript feed driven roller 26 and manuscript discharge driven roller 33 may be composed of driving rollers as in the case of the manuscript feed driving roller 25 and manuscript discharge driving roller 32, that is, all of the rollers may be composed of driving rollers. Conversely, the rollers 26 and 33 provided for the supporting body 73 may be composed of driving rollers.

Alternatively, the thick manuscript carriage 85 may be constructed such that it can hold the peripheral edge of the thick manuscript.

In the above embodiment a number of copies are formed from the single electrostatic charge latent image once formed on the photosensitive drum. But the present invention can be also applied to an electrophotographic apparatus in which each copy is formed from respective latent image, i.e. the manuscript is exposure-scanned each time a single copy is printed. In such a case the light shielding portion 92 shown in FIG. 7 is preferably formed as a white member or paint having a reflective coefficient substantially equal to that of the white manuscript.

What is claimed is:

1. In a manuscript feed device for an electrophotographic apparatus comprising an elongated manuscript tray for defining a sheet manuscript feed path, upper and lower side feed mechanisms arranged at a front end of said manuscript tray above and below said manuscript feed path with said sheet manuscript feed path interposed therebetween, said upper side feed mechanism being disposed so as to be aligned with said lower side feed mechanism thereby constituting a thick manuscript feed path together with the manuscript tray, a sheet manuscript driving means, and a thick manuscript driving means for feeding a thick manuscript carriage and located at the outside of the maximum width position of the sheet manuscript, the improvement comprising a sheet manuscript guide means which is movably connected at one edge of said manuscript tray to prevent the sheet manuscript from passing over said thick manuscript driving means when feeding the sheet manuscript, and a thick manuscript guide means arranged at an outer position relative to the sheet manuscript guide means viewed along the width of the manuscript, the thick manuscript guide means being exposed when said sheet manuscript guide means is moved so as to guide the thick manuscript carriage along the manuscript tray.

2. A device as claimed in claim 1, wherein said sheet manuscript guide means is pivoted at one end with respect to the manuscript tray and operative to be rotated to a position which causes said thick manuscript guide means to become exposed.

3. A device as claimed in claim 1, wherein said manuscript tray has a recess along said one edge and the sheet manuscript guide means comprises a rod-shaped member which can be fitted in said recess.

* * * * *